(12) United States Patent
Steinich

(10) Patent No.: US 7,548,057 B2
(45) Date of Patent: *Jun. 16, 2009

(54) FULL WAVEGUIDE

(76) Inventor: Klaus Manfred Steinich, Goethestraβe 8, 85604 Zorneding (DE)

( * ) Notice: Subject to any disclaimer, the term of this patent is extended or adjusted under 35 U.S.C. 154(b) by 193 days.

This patent is subject to a terminal disclaimer.

(21) Appl. No.: 10/567,997

(22) PCT Filed: Aug. 12, 2004

(86) PCT No.: PCT/EP2004/009068

§ 371 (c)(1),
(2), (4) Date: Aug. 21, 2006

(87) PCT Pub. No.: WO2005/017462

PCT Pub. Date: Feb. 24, 2005

(65) Prior Publication Data

US 2007/0188162 A1 Aug. 16, 2007

(30) Foreign Application Priority Data

| Aug. 14, 2003 | (DE) | ................. 103 37 455 |
| Sep. 25, 2003 | (DE) | ................. 103 44 628 |
| Nov. 5, 2003 | (DE) | ................. 103 51 650 |

(51) Int. Cl.
*G01B 7/14* (2006.01)
*G01R 33/038* (2006.01)

(52) U.S. Cl. ............................ 324/207.13; 324/207.24

(58) Field of Classification Search ............ 324/207.11, 324/207.12, 207.13, 207.15, 207.16, 207.24, 324/207.22, 209; 73/862.333
See application file for complete search history.

(56) References Cited

U.S. PATENT DOCUMENTS

| 2,511,178 | A |   | 6/1950 | Roters |
| 2,713,263 | A | * | 7/1955 | Turner ...................... 73/290 R |
| 3,056,099 | A |   | 9/1962 | Dvoracek |
| 4,864,232 | A | * | 9/1989 | Redlich ................. 324/207.12 |
| 5,680,041 | A |   | 10/1997 | Begin |
| 7,239,129 | B2 | * | 7/2007 | Steinich ................. 324/207.13 |
| 2001/0017539 | A1 | * | 8/2001 | Brunsch et al. ........ 324/207.13 |
| 2005/0200353 | A1 |   | 9/2005 | Steinich et al. |

FOREIGN PATENT DOCUMENTS

| DE | 690 16 774 T2 | 9/1995 |
| DE | 199 54 328 A | 3/2001 |
| DE | 101 64 121 A | 7/2003 |
| DE | 102 01 880 A1 | 7/2003 |
| DE | 102 34 960 A1 | 2/2004 |

* cited by examiner

*Primary Examiner*—Kenneth J Whittington
(74) *Attorney, Agent, or Firm*—Head, Johnson & Kachigian, P.C.; Mark G. Kachigian

(57) ABSTRACT

A position sensor according to the transit time principle of a mechanical-elastic wave. The position sensor includes a waveguide made out of electrically conductive material, and a detector coil in a detector range being arranged coaxially on the waveguide. A position magnet moveable along the waveguide. A position magnet moves along the waveguide and a flux guide unit is assigned to the detector coil.

23 Claims, 6 Drawing Sheets

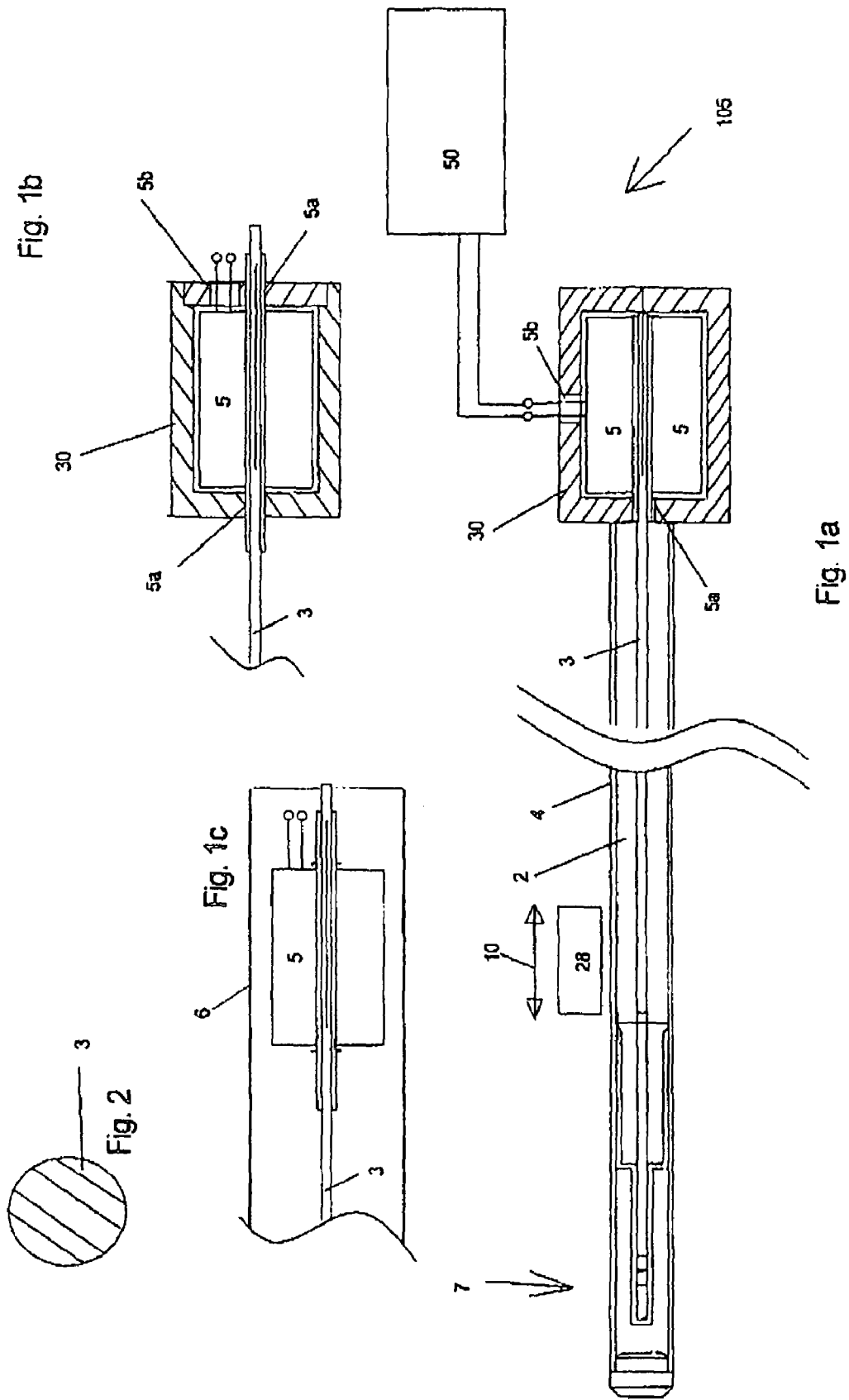

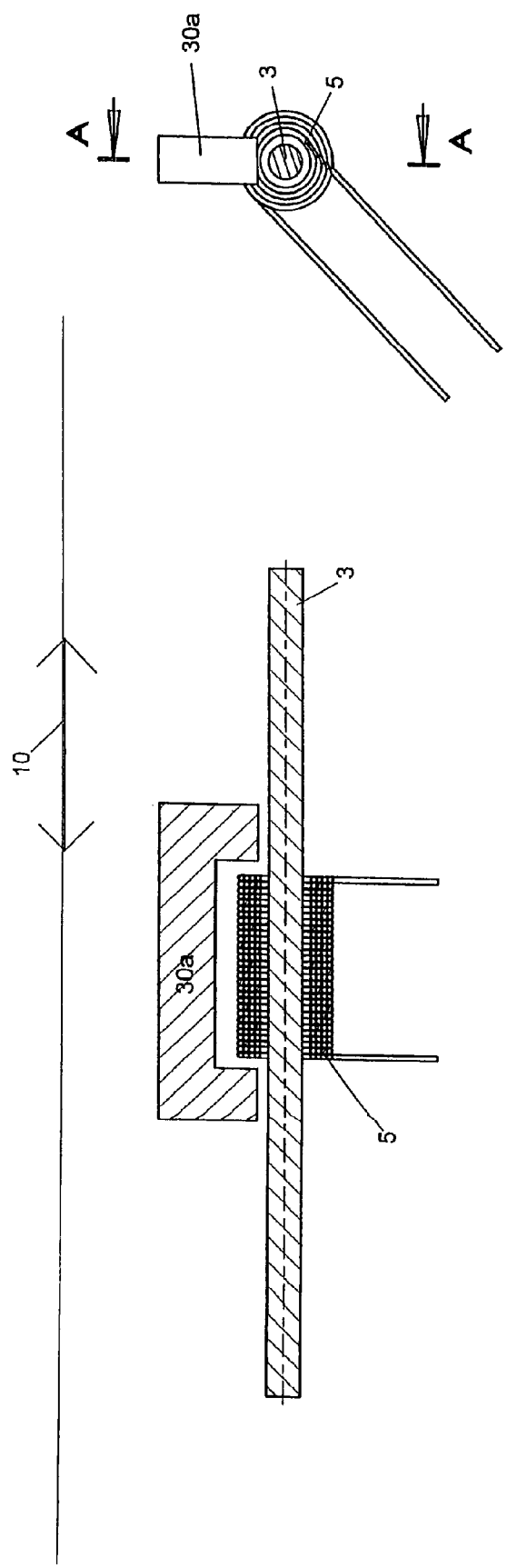

Figure 4B:
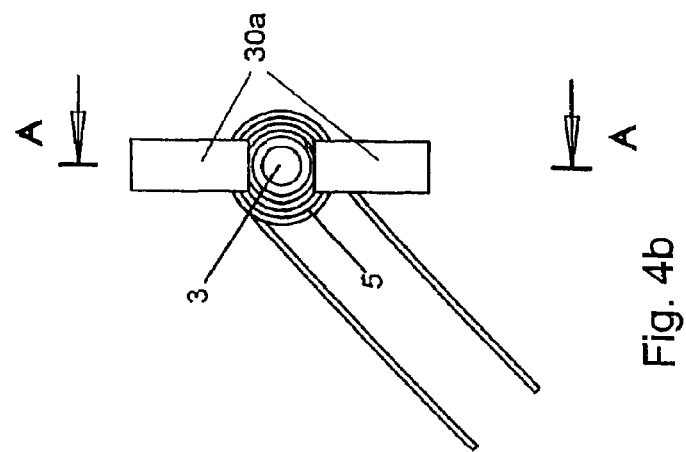

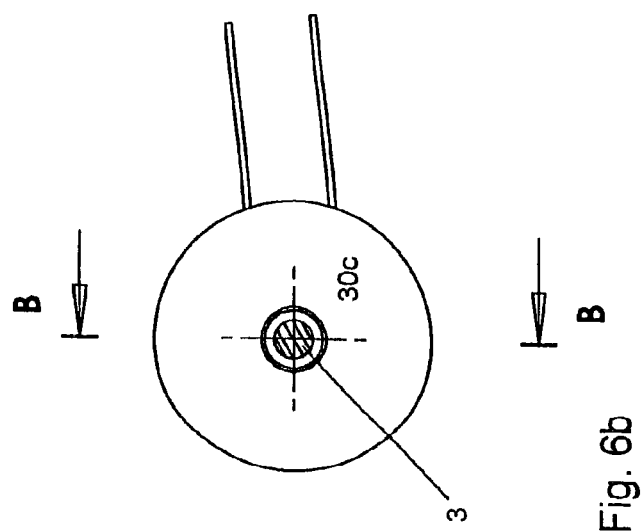
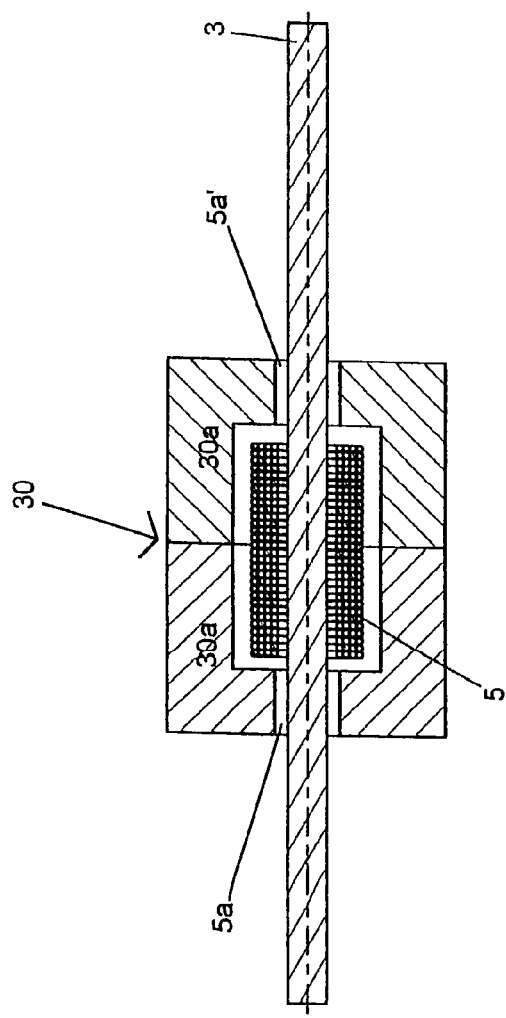
Fig. 6b
Fig. 6a

FULL WAVEGUIDE

CROSS-REFERENCE TO RELATED APPLICATION

This is a United States National Phase Application of PCT Application No. EP2004/009068 application having an international filing date of 12 Aug. 2004 which claims priority to German Application No. 103 37 455.8 filed 14 Aug. 2003 and to German Patent Application No. 103 44 628.1 filed 25 Sep. 2003 and to German Patent Application No. 103 51 650.6 filed 5 Nov. 2003.

STATEMENT REGARDING FEDERALLY SPONSORED RESEARCH OR DEVELOPMENT

N/A

REFERENCE TO A MICROFICHE APPENDIX

N/A

BACKGROUND OF THE INVENTION

Field of the Invention

The invention regards position sensors, in particular their detector unit, based on the principle of travel time measurement of mechanical-elastic impulses in a waveguide, which besides this waveguide, comprises a relatively maneuverable position element, which generates or detects the mechanical-elastic wave.

The waveguide normally consists of a tube, a wire or a ribbon, and can also serve as an electrical conductor. The waveguide can also be arranged in a form-giving, linear or circular body made of non-magnetic material, i.e. plastic or metal, for the seating and suspension of the waveguide.

Based on the Wiedemann effect, an electric current fed into the waveguide at its superimposition with an external magnetic field oriented laterally to the magnetostrictive waveguide, which originates from a position element, in particular a position magnet, generates a torsion impulse of a mechanical-elastic wave, which spreads out from the place of origin at approx. 2,500 m/s -6,000 m/s, or the position of the position element, for example, along the waveguide in both directions.

At a position, usually at one end of the waveguide, the torsion of this mechanical-elastic impulse is detected by a detector unit that is mainly in a fixed position in regards to that of the waveguide. The length of time between the release of the energizing current and the receipt of the mechanical impulse is thereby a measure of the distance of the movable position element, for example, from the position magnets by the detector mechanism or also the coil or the electromagnets.

A typical such sensor is described in U.S. Pat. No. 896,714.

The main focus of the invention at hand is on the detector mechanism. This includes a detector coil, which is either arranged around the waveguide or is arranged around a Villary band as a so-called Villary detector, which reaches out diagonally, in particular, at a 90° angle, from the waveguide and is connected with it in such a manner, in particular, mechanically affixed, i.e. welded, that the torsion impulse running along the waveguide is transformed into a longitudinal wave in the Villary band. Such a longitudinal wave elastically compresses or elongates the Villary band in the crystalline spectrum, and therefore changes its permeability $\mu$.

For this purpose, the Villary band is made of a material with the highest possible magnetic permeability $\Delta\mu_r$, i.e. from nickel or a nickel alloy.

The one magnetoelastic element, i.e. the density wave passing through the Villary band, thus manifests itself in a voltage fluctuation $\Delta U$, which can be tapped as a information signal at the detector coil.

As is apparent, the larger the information signal $\Delta U$, the larger the change of the magnetic permeability $\Delta\mu_r$ precipitated.

In addition, such range of the curve $\Delta\mu_r(H)$ is desired as the operating point or operating range, or the magnetic permeability plotted over the magnetic field strength, in which the magnetic permeability $\Delta\mu_r$ is as linear as possible, relative to the cause but changed as strongly as possible, which is why the function $\Delta\mu_r(H)$ should be developed as steeply as possible in the leading edge and why the operating range should be established in the approaching linear range.

In the state of the art, a so-called bias magnet in the form of a permanent magnet in the spatial proximity to the detector coil will be arranged for the adjustment of the operating point, i.e. parallel to the Villary band.

The operating point of the magneto-elastic detector unit is mainly dependent on its position relative to the detector coil near the magnetic parameters of the bias magnets.

In many regards, this is detrimental, for example during deployment of the position sensor in locations that are subject to mechanical and in particular, dynamically mechanical stresses and strains or even accelerate thermal impacts, which change the magnetic parameters of the bias magnets and in particular its aging process, which likewise have a change of the magnetic parameters as a consequence.

In addition, all deviations from the target form arising in the manufacture of the bias magnets are detrimental in the same manner. The same applies for the production-required variation of the magnetic parameters in the manufacture of the bias magnets.

An additional disadvantage is that the operational point is negatively changed if the position magnets approach the detector coil too closely. According to the state of the art for detector orientation, the waveguide would therefore have to be extended enough over the measurement range, within which the position magnet could move back and forth, that the detector unit with the detector coal was sufficiently far enough away from the measurement range, in order to reduce electromagnetic interferences to a controllable degree. However, a total length of the position sensor thereby resulted, which was distinctly larger than its measuring range.

While the designs in the past were principally disseminated with Villary bands sticking out diagonally from the waveguide, which was enveloped by the detector coil, on the basis of the high amplitude that could be achieved thereby, this has the drawback of a complex manufacturing process.

In the past, it was already common, to use the waveguide itself either with a solid cross-section, thus as a conductor, or also with a hollow cross-section, as a tube. When also using the waveguide as an electrical conductor, the pre-form was favored, because of a lack of a magnetic field generated by the electrical current in the interior of the tubular electrical conductor.

BRIEF SUMMARY OF THE INVENTION

It is the role of the existing invention to simplify a position sensor of this construction principal so that function is guaranteed with sufficient accuracy, despite clearly lower production costs.

Despite expectations, it was determined that when using an electrically conductive waveguide, which simultaneously serves as an electrical conductor, with coaxial configuration of the detector coil directly on the electrical conductor and configuration of a corresponding shielding around the detector coil, in particular in the form of a flux guide component, the information signal sufficiently differentiates itself from the existing interfering signal, in particular if the shielding surrounds the detector coil as tightly as possible.

In doing so, a current feed of the detector coil cannot be dispensed with, but rather this even possibly has a negative impact, and also compensation for the changing temperature within the detector array can be dispensed with after actuation of the sensor.

Consequently, the detector coil is arranged in an end range coaxial to the filamentary waveguide and—before or after—provided with shielding, in particular by means of a likewise cylindrical flux guide unit. The sensor is functional after attachment of the detector coil to a detector circuit—after suitable suspension of the waveguide.

The form and arrangement of the flux guide unit relative to the detector coil will be selected so that the magnetic flux path enabled by the flux guide component at least surrounds the windings of the coils of the entire detector coil in at least one layer, for example, the axial layer. Preferably, the detector coil will enclose the flux path without interruption.

To that effect, the form of the flux conductor component can be variably constructed:

In a simple embodiment, a C-forming flux conductor component overlaps the coaxial on the detector coil applied to the waveguide so that the C-portion is directed to the waveguide with its free ends of both sides of the coil at a small distance. Thereby, a magnetic circuit is completed out of the C-forming flux guide component and the corresponding portion of the waveguide through the small air gap between the waveguide and the flux guide component, which represents the magnetic flux path, which is enabled by means of the flux guide component.

Although the bulk of the detector coil lies outside of this magnetic circuit, the signal quality of the electrical signal delivered from the detector coil is thereby already strongly enhanced.

The result is additionally improved in that the detector coil is wrapped in always increasing measure by the magnetic flux path, for example through the location of two opposing C-shaped flux guide components or even more such C-shaped flux guide components distributed over the length of the waveguide.

In the ideal case, a correspondingly formed flux guide body encloses the detector coil—except for the required inlets and outlets—completely as possible, and will thus normally consist of two complementary molds.

Even so, instead of and/or supplementary to the previously named measures, an improvement of the information signal relative to the interfering signal can be achieved, if electrical return necessary for the position sensor is arranged coaxially around the detector coil, at least in the area of the detector coil, in particular especially tubular and preferably extensively enclosed, in any case.

This effect especially occurs when the material is not only electrically conductive, but rather is also magnetically shielded and thus exhibits a permeability of $\mu > 1$.

BREIF DESCRIPTION OF THE DRAWINGS

Figure 4A:
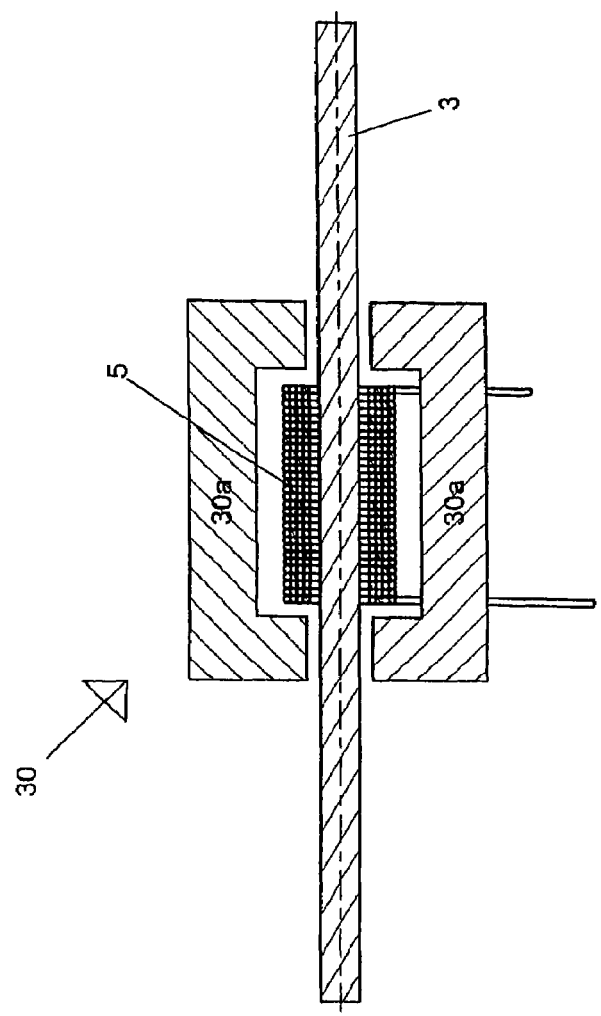
Figure 4C:
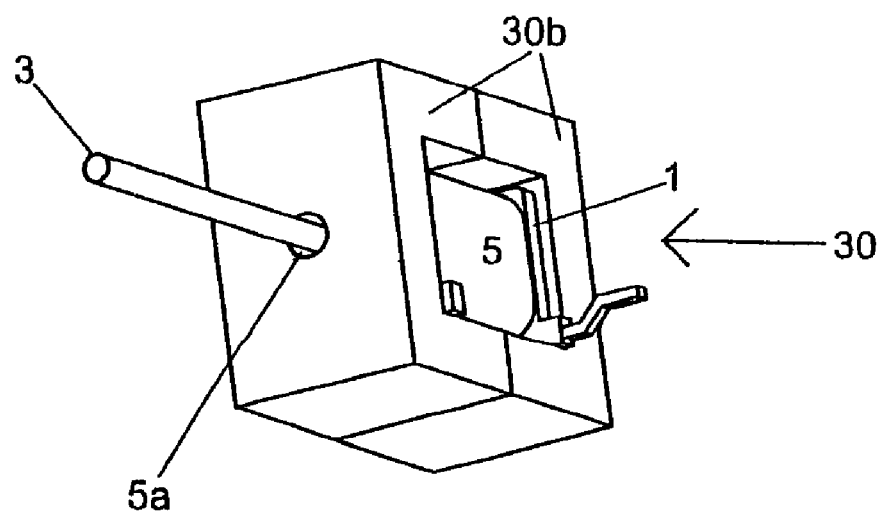
Figure 5B:
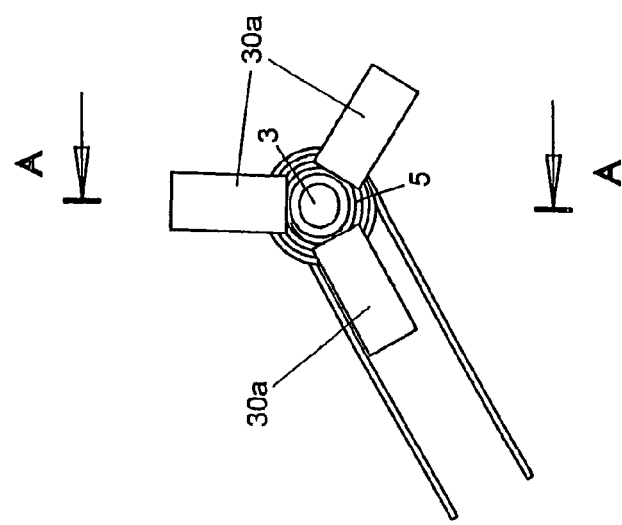
Figure 5A:
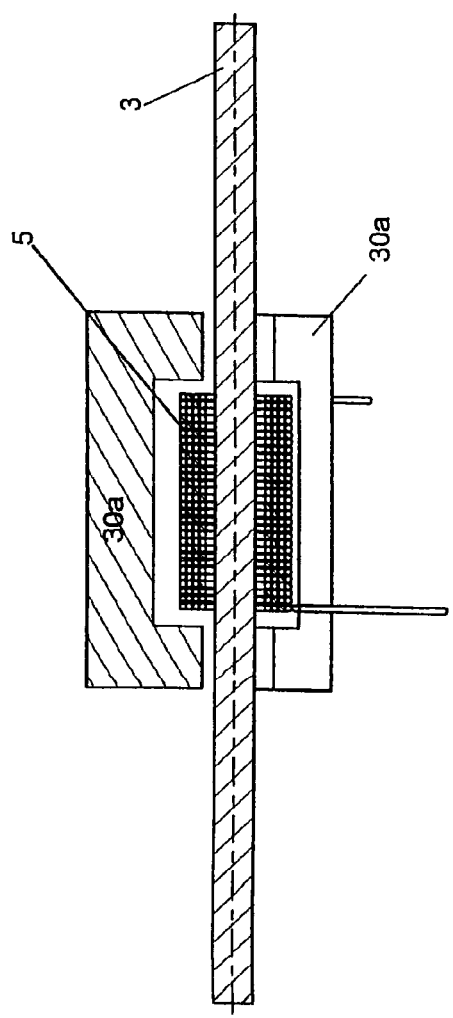

Embodiments in accordance with the invention are more closely described with examples in the following. Displayed are:

FIGS. 1(a)-(c): A schematic diagram of the position sensor according to the invention,
FIG. 2 A cross-section through the waveguide 3,
FIGS. 3(a)-(b): Additional designs of the flux guide unit.
FIGS. 4(a)-(c): Additional designs of the flux guide unit,
FIGS. 5(a)-(b): Additional designs of the flux guide unit,
FIGS. 6(a)-(b): Additional designs of the flux guide unit.

BRIEF DESCRIPTION OF THE PREFERRED EMBODIMENTS

FIG. 1 shows the entire position sensor, consisting of the waveguide 3 proceeding in measurement direction and on its detector assembly 105, as well as with the detector circuit 50 connected with the detector assembly 105.

The detector circuit 50 can be arranged locally separated from the waveguide unit, and must be connected with detector coil 5 solely through two electrical conductors.

Without making contact, the position sensor measures the position of the moveable position magnets 28 in the measurement direction 10 along the waveguide unit relative to the sensor head of the waveguide 3, or up to the detector coil 5.

At least in sections, the waveguide 3 exhibits a solid cross-section of preferably circular external contour, in particular over its entire length, as shown in FIG. 2.

For example, in its progression, the waveguide 3 is accommodated in a support tube 4, which for instance possesses a clearly larger interior diameter as the external diameter of the waveguide 3, and in which the waveguide 3 is coaxially positioned through the arrangement of a hose forming spacer 2 made of electrically non-conductive and non-magnetic material, more specifically a plastic material that is arranged coaxially around the waveguide 3 and with the support tube 4.

The free end of the waveguide 3 facing away from the detector head and thus the detector coil 5 is accommodated in a special dampening arrangement.

The detector coil 5 is arranged coaxial to the waveguide 3, but does not touch it, so that a spacer sleeve is positioned out of non-guide material in between.

In the detector coil 5, the coils can be arranged in layers diagonally to the longitudinal direction 10, or also—in the construction of the detector coil 5 as a toroid coil—in layers along the longitudinal direction 10.

The waveguide 3 can only exit the detector coil 5 on a front side, as depicted in FIG. 1a, or completely penetrate the detector coil in the longitudinal direction, as depicted in FIG. 1b.

Independent thereof, the flux guide unit 30 only exhibits one or two opposing frontal openings 5a, 5a' for the entry and, if necessary, the exit of the waveguide 3 and possible its insulating sleeve in respect to the detector coil 5, and in addition, at least one opening 5b for the passage of electrical connections from the detector coil 5 to the evaluation circuit 50.

In doing so, the flux guide unit 30—as depicted in FIG. 1a—can consist of two half-shells with junction planes parallel to the longitudinal direction 10 or also from a cup-shaped housing with frontal cover plate, as depicted in FIG. 1b.

Even a design made of two shell-shaped flux guide units 30c oriented with the open sides against each other is possible, as depicted in FIG. 6 in the longitudinal section and in a frontal view, in which the waveguide passes through the shell-shaped parts 30c through central waveguide openings 5a or 5a' into the otherwise closed bottoms of the shell-shaped parts, while the electrical connections of the coil 5 leave the interior of the flux guide unit through at least one opening that cannot be indicated here, preferably on the plane of contact of both shell-shaped parts 30c.

In opposition to the previously described variants, in which the flux guide unit 30 completely encloses the detector coil 5 and the waveguide 3 as far as possible, except for the passage openings for electrical connections, FIG. 3-5 in each case show solutions in side and frontal views, in which the flux guide unit consists of one or more C-shaped flux guide components 30a or 30b, which consequently do not completely enclose the detector coil 5.

In the simplest solution according to FIG. 3, such a C-shaped flux guide component 30a, is arranged with its connecting longitudinal shank in the longitudinal direction 10, or parallel to the waveguide 3, so that both free ends of the C-part 30a are oriented towards both sides of the frontal ends of the detector coil 5 against the waveguide 3 and the C-shaped flux guide component 30a.

According to FIG. 4, two such C-parts 30a are correspondingly arranged on sides of the waveguide 3, positioned in opposition to each other, so that the entire detector coil 5 lies within the flux guidance component 30, but is not completely enclosed tightly by it.

Through an increasing number of such C-parts 30a distributed over the length, for example, three C-parts 30a as depicted in FIG. 5, or a higher number of C-parts, the ranges of coverage of the detector coil 5 that is not covered by flux guide components become smaller and thereby the quality of the signal delivered by the detector coil becomes increasingly better.

FIG. 4c shows a modification of two C-shaped flux guide components 30b, which in this case are not arranged in each case on one of both sides of the waveguide, but rather are both threaded on the waveguide 3 by means waveguide openings 5a located in the connecting shanks of the C-parts 30b, while the free ending shanks of the flux guide component are positioned opposing each other and should mutually contact one another.

Figure 4D:
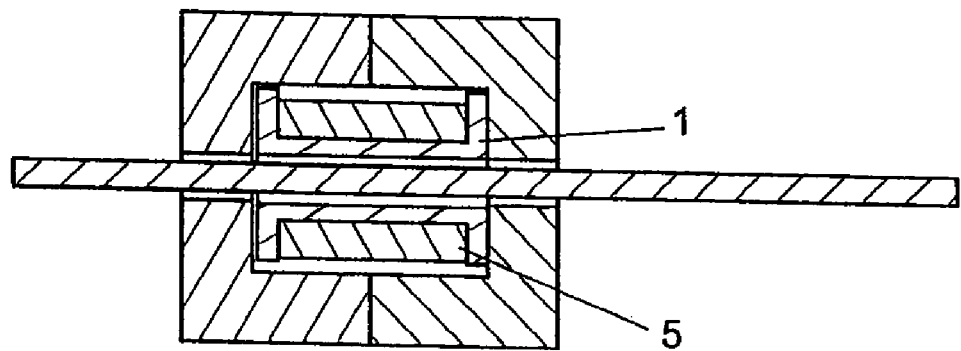

In the side view according to FIG. 4d, this solution is to be recognized that the detector coil 5 can be wound up in the H-shaped coil base plate 1 in the side view of also in the cross-section, instead of the base plate free, self-supporting detector coils 5 represented in the other drawings.

In the perspective view on the two opposing pages, FIG. 4c shows the sides of such a detector coil 5 not covered by the flux guide body, from which the corresponding connections for the detector coil 5 can be lead through.

In addition, Fig 1c shows a solution, in which the likewise coaxial detector coil 5 arranged on the waveguide 3 is not surrounded by a flux guide unit but rather by a coaxial, tubular,. electrical return positioned around the detector coil 5. This effect especially occurs when its material is not only electrically conductive, but rather is also magnetically shielded and thus exhibits a permeability of $\mu>1$, in particular $\mu>10$, in particular $\mu>1,000$, in particular, in particular $\mu>10,000$. The flux guide unit is formed of ferromagnetic material.

Also, magnetic fields impacting the detector coil 5 from outside are kept out by this means.

Even a combination of both possibilities is possible, or the arrangement of a flux guide unit in addition to a coaxial return 6 with the described characteristics. While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification. but is to be limited only by the scope of the attached claim or claims. including the full range of equivalency to which each element thereof is entitled.

DEVICE COMMENT LIST

1 Base plate
2 Support hose
3 Waveguide
4 Support tube
5 Detector coil
5a, 5a' Waveguide opening
5b Connection opening
6 Return
7 Damping arrangement
10 Longitudinal direction
28 Position magnet
30 Flux connecting unit
30a C-shaped flux guide component
30b C-shaped flux guide component
30c Shell-shaped flux guide components
50 Evaluation circuit
105 Detector arrangement

The invention claimed is:

1. A position sensor according to the transit time principle of a mechanical-elastic wave, said sensor comprising:
   a waveguide made of electrically conductive material;
   a detector coil in a detector range being arranged coaxially on the waveguide;
   a position magnet moveable along the waveguide;
   a flux guide unit being assigned to said detector coil; and
   an electrical return, at least in the axial range of the detector coil of the return, being coaxially arranged externally around the detector coil wherein said electrical return consists of electrically conductive and also magnetic shielding material.

2. The position sensor under claim 1 wherein said waveguide possesses a solid cross-section.

3. The position sensor according to claim 1 wherein said waveguide has a solid cross section through an entire waveguide measurement range.

4. The position sensor according to claim 1 wherein said detector coil is also a part of a detector arrangement just like a detector circuit.

5. The position sensor according to claim 1 wherein said flux guide unit of said detector coil is assigned so that said flux guide unit simultaneously shields said detector coil against undesired external magnetic fields.

6. The position sensor according to claim 1 wherein a magnetic flux path of the magnetic flux enabled by said flux guide unit encloses windings of said detector coil at least once including said waveguide in the flux path.

7. The position sensor according to claim 6 wherein said magnetic flux path enabled by said flux guide unit surrounds said detector coil in at least one axial layer surrounding said detector coil.

8. The position sensor according to claim 6 wherein said magnetic flux path enabled by said flux guide unit surrounds the entire detector coil.

9. The position sensor according to claim 1 wherein said flux guide unit encloses said detector coil along an axial layer of said detector coil.

10. The position sensor under claim 1 wherein said electrical return exhibits a completely enclosed cross-section.

11. The position sensor according to claim 1 wherein said flux guide unit encloses said detector coil.

12. The position sensor according to claim 11 wherein said flux guide unit is primarily cylindrically shell-shaped with two opposing openings in the enclosed front side for entry and exit of said waveguide and a conductor opening for the passage of the electrical conductor for said detector coil, in which the conductor opening is found in a cylindrical surface area of said flux guide unit.

13. The position sensor according to claim 12 wherein said cylindrical flux guide unit consists of a cup-shaped body with an open front side and a suitable cover on the frontal opening.

14. The position sensor according to claim 12 wherein the cylindrical housing consists of two half-cylindrical shells.

15. The position sensor according to claim 1 wherein said detector coil is constructed as a self-supporting coil.

16. The position sensor according to claim 1 wherein said detector coil is wrapped on a coil shell in a longitudinal view.

17. The position sensor according to claim 1 wherein said flux guide unit having an opening for said waveguide and an opening for electrical conductors connected to said detector completely encloses said detector coil.

18. The position sensor according to claim 17 wherein said flux guide unit consists of a ferromagnetic material with a permeability of $\mu>10$.

19. The position sensor according to claim 17 wherein said flux guide unit consists of a highly permeable alloy out of ferrite.

20. The position sensor according to claim 1 wherein a direct current is flowed through said waveguide.

21. The position sensor according to claim 1 wherein an axial direction of said detector coil corresponds with a longitudinal direction of said waveguide.

22. The position sensor according to claim 1 wherein said flux guide unit coaxially encloses said detector coil along an axial layer of said detector coil.

23. A position sensor according to the transit time principle of a mechanical-elastic wave, said sensor comprising:
    a waveguide made of electrically conductive material;
    a detector coil in a detector range being arranged coaxially on the waveguide;
    a position magnet moveable along the waveguide;
    a flux guide unit being assigned to said detector coil; and
    an electrical return, at least in the axial range of the detector coil of the return, being coaxially arranged externally around the detector coil wherein said electrical return consists of electrically conductive and also magnetic shielding material, and wherein said electrical return exhibits a completely enclosed cross-section.

* * * * *